(12) United States Patent
Jeong

(10) Patent No.: US 7,374,314 B2
(45) Date of Patent: May 20, 2008

(54) EXTERNAL ELECTRODE FLUORESCENT LAMP AND MANUFACTURING METHOD THEREOF

(75) Inventor: In Suk Jeong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 52 days.

(21) Appl. No.: 11/158,008

(22) Filed: Jun. 22, 2005

(65) Prior Publication Data
US 2006/0002115 A1 Jan. 5, 2006

(30) Foreign Application Priority Data
Jun. 30, 2004 (KR) ...................... 10-2004-0049948

(51) Int. Cl.
*F21V 23/02* (2006.01)
(52) U.S. Cl. ...................... 362/260; 313/607
(58) Field of Classification Search ................ 362/200, 362/561, 614, 260, 600; 313/607, 491, 594, 313/234
See application file for complete search history.

(56) References Cited

U.S. PATENT DOCUMENTS 5,013,966 A * 5/1991 Saikatsu et al. ............ 313/493
6,922,016 B2 * 7/2005 Yoo et al. ................... 313/607
2004/0135484 A1 * 7/2004 Lim ........................... 313/234

FOREIGN PATENT DOCUMENTS

| EP | 1 426 778 | 6/2004 |
| EP | 1426778 A2 | 6/2004 |
| KR | 10-2001-0074027 | 8/2001 |
| KR | 10-2004-0052887 | 6/2004 |

* cited by examiner

*Primary Examiner*—Ross Gushi
(74) *Attorney, Agent, or Firm*—McKenna Long & Aldridge LLP

(57) ABSTRACT

An external electrode fluorescent lamp includes an external electrode having an increased surface area. The external electrode fluorescent lamp includes a lamp tube, the lamp tube including a "W"-like shaped end portion, and a double-tube external electrode formed on an outer surface of the "W"-like shaped end portion, the double-tube external electrode including a first electrode on a concave outer surface of the "W"-like shaped end portion, and a second electrode formed on a non-concave outer surface of the "W"-like shaped end portion. Alternatively, the external electrode fluorescent lamp includes a lamp tube, the lamp tube having two end portions and an intermediate portion between the end portions and a diameter of the end portions being larger than a diameter of the intermediate portion, and external electrodes respectively formed on an outer surface of the end portions of the lamp tube.

12 Claims, 12 Drawing Sheets

Fig.6C
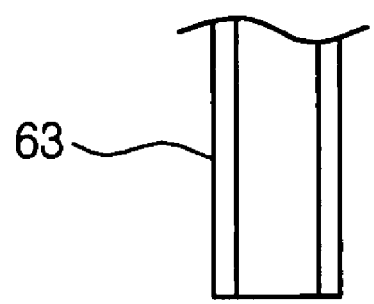
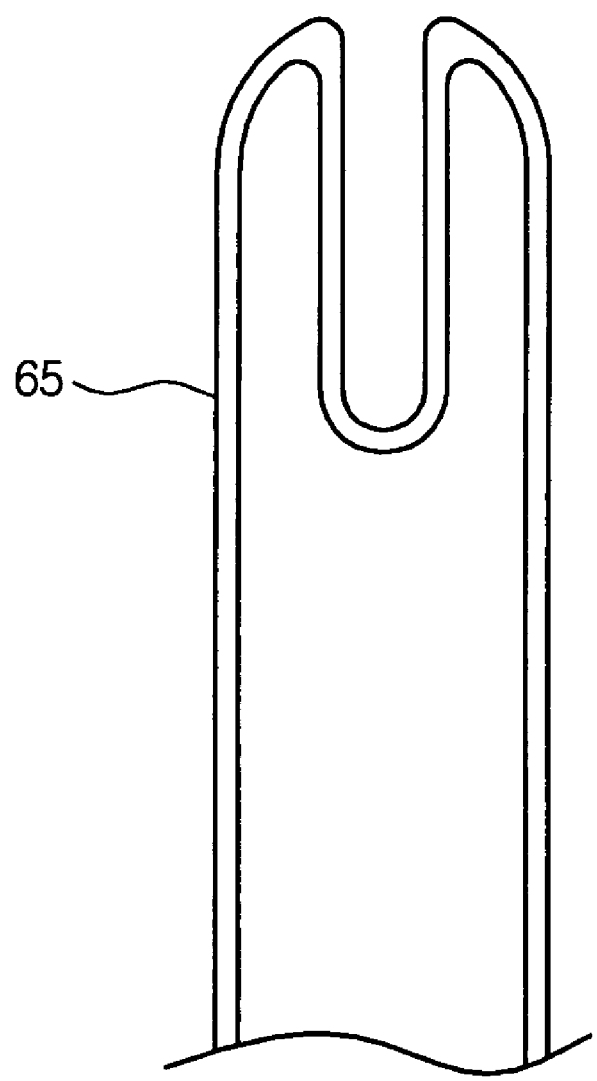

Fig.8A
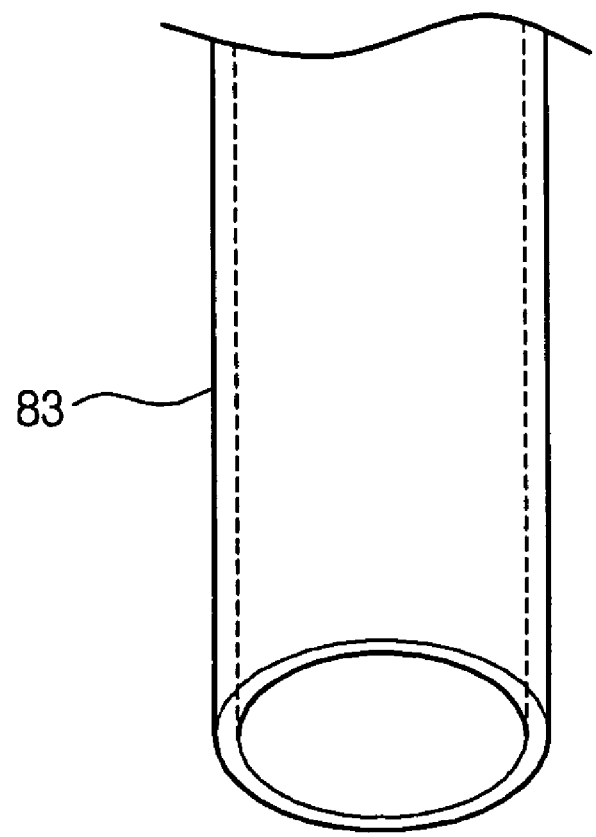
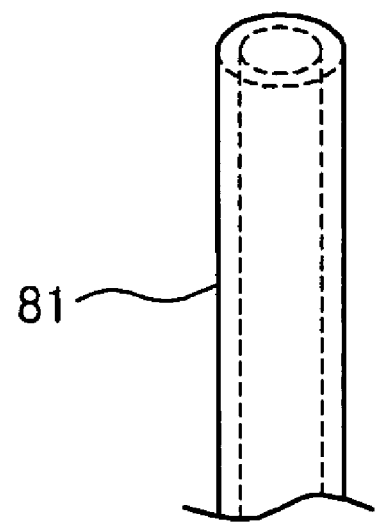

EXTERNAL ELECTRODE FLUORESCENT LAMP AND MANUFACTURING METHOD THEREOF

The present invention claims the benefit of Korean Patent Application No. 49948/2004 filed in Korea on Jun. 30, 2004, which is hereby incorporated by reference.

BACKGROUND OF THE INVENTION

1. Field of the Invention

The present invention relates to a lamp, and more particularly, to an external electrode fluorescent lamp and a manufacturing method thereof that increase the external surface area of the electrode.

2. Discussion of the Related Art

Nowadays, image display devices are developed from cathode ray tubes (CRTs) into liquid crystal display (LCD) devices and plasma display panel (PDP) devices. LCD devices have been spotlighted as the next generation display because they have advantages characteristics, such as small size, light-weight, and low power consumption, and they do not generate harmful electromagnetic waves.

In general, an LCD device includes a lower substrate having a thin film transistor (TFT) formed thereon, an upper substrate having color filters arranged thereon, and a liquid crystal layer injected into a gap between the lower and upper substrates. For example, the TFT receives and transmits control signals to generate an electric field, and an alignment of liquid crystal molecules in the liquid crystal layer is changed in accordance with the electric field, thereby altering a light transmittance thereof. As a result, a color image is displayed using the liquid crystal molecules having a refractive anisotropy and a dielectric anisotropy and passing light through the color filters.

Because an LCD device cannot generate light by itself, the LCD device also includes a backlight unit for emitting light toward a liquid crystal display panel. Backlight units are classified into an edge type and a direct type according to the position of a light source relative to a display plane. In particular, the direct type backlight unit has a high light efficiency, imposes no limitation in the size of an image display surface and can be easily handled. Thus, the direct type backlight unit is widely used for a large-sized LCD device, e.g., an LCD device of more than 30 inches.

The direct type backlight unit does not require a light guide for converting linear light from a lamp into plane light. Instead, a direct type backlight unit includes a plurality of lamps provided at a lower portion of the display plane, a reflection sheet for reflecting light from the lamp to the display plane to prevent light loss, and a diffuser plate for scattering the light to an upper side of the lamps to emit light uniformly. The lamps include one of a point light source, such as an incandescent lamp and a white halogen lamp, a linear light source, such as a hot cathode fluorescent lamp (HCFL), a cold cathode fluorescent lamp (CCFL), and an external electrode fluorescent lamp (EEFL), and a planar light source, such as light emitting diodes (LEDs) in a matrix shape.

Currently, cold cathode fluorescent lamps (CCFLs) are widely used, but external electrode florescent lamps (EEFLs) are gradually replacing the CCFL. Since an EEFL has brightness of more than 400 nit, which is 60% greater than brightness of a CCFL, the EEFL can expand the TFT-LCD application field such as TV. In addition, unlike a CCFL having electrodes within lamps, an EEFL has external electrodes and thus is advantageous in operating in parallel, such that a uniform brightness can be realized by reducing a voltage deviation between the lamps. Further, inverters that are required for driving a plurality of EEFLs can be reduced because EEFLs can be driven by a multi-driving method. As a result, the number of parts of the backlight unit is reduced, and the manufacturing cost and the weight of the LCD module can be remarkably reduced.

FIG. 1 is a plane view illustrating a direct type backlight unit of an LCD device according to the related art. In FIG. 1, a direct type backlight unit 1 includes a plurality of external electrode fluorescent lamps (EEFLs) 11 for emitting light and an inverter 21 for driving the lamps 11. Each of the lamps 11 includes external electrodes 13 and 15 formed respectively at both ends thereof. The external electrodes 13 and 15 are connected to the inverter 21 through one of common electrodes 17 and 19 and through one of lamp wires 23. Thus, a voltage from the inverter 21 is applied through the lamp wires 23 to the common electrodes 17 and 19 to the lamp 11, and a current flows due to a discharge between glass layers (dielectric layers) of the lamp 11. In addition, the current can be controlled and the respective lamps 11 can be simultaneous turned on/off, thereby enabling a multi-driving thereof.

FIG. 2 is a cross-sectional view illustrating an EEFL of the backlight unit shown in FIG. 1 during an emission. As shown in FIG. 2, the external electrodes 13 and 15 are respectively formed on external surfaces of end portions of the lamp 11. When an AC voltage is applied to the external electrodes 13 and 15, an electric field is generated inside the lamp 11. The generated electric field then causes plasma to be generated inside the lamp 11. As a result, the generated plasma causes charges to accumulate on an inner surface of the lamp 11 corresponding to the external electrodes 13 and 15, and such charges cause a magnetic discharge to occur.

In particular, when a high frequency and high voltage is applied to the lamp 11, a strong electric field can be generated at the external electrodes 13 and 15. Such a generated electric field excites gas in the lamp 11, causing UV rays to be emitted. The emitted UV rays then excite a fluorescent material within the lamp 11, thereby causing light emission.

However, when an EEFL is used in a large-size LCD device, e.g., an LCD device of 30-inch or larger, such an EEFL must be long. Thus, the EEFL requires an even higher driving voltage to generate a sufficient electric field to emit light, thereby resulting in difficulty when using the EEFL.

SUMMARY OF THE INVENTION

Accordingly, the present invention is directed to an external electrode fluorescent lamp and a manufacturing method thereof that substantially obviate one or more of the problems due to limitations and disadvantages of the related art.

An object of the present invention is to provide an EEFL and a manufacturing method thereof, in which the EEFL can be driven at a low driving voltage by increasing an external surface area of an external electrode.

Another object of the present invention is to provide an EEFL and a manufacturing method thereof, in which a driving voltage of the EEFL can be reduced and a multi-driving and a high brightness can be provided.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an external electrode fluorescent lamp includes a lamp tube having a "W"-like shaped end portion, and a double-tube external electrode formed on an outer surface of the "W"-like shaped end portion, the double-tube external electrode including a first electrode on a concave outer surface of the "W"-like shaped end portion, and a second electrode formed on a non-concave outer surface of the "W"-like shaped end portion.

In another aspect, a backlight unit includes an external electrode fluorescent lamp including a lamp tube having a "W"-like shaped end portion, and a double-tube external electrode formed on an outer surface of the "W"-like shaped end portion, the double-tube external electrode including a first electrode on a concave outer surface of the "W"-like shaped end portion, and a second electrode formed on a non-concave outer surface of the "W"-like shaped end portion, and an outer case securing the external electrode fluorescent lamp.

In yet another aspect, a liquid crystal display device includes a liquid crystal display panel including an upper substrate, a lower substrate attached to the upper substrate, and a liquid crystal layer between the upper and lower substrates, a backlight unit disposed at a back side of the liquid crystal display panel, the backlight unit including an external electrode fluorescent lamp having a lamp tube having a "W"-like shaped end portion, and a double-tube external electrode formed on an outer surface of the "W"-like shaped end portion, the double-tube external electrode including a first electrode on a concave outer surface of the "W"-like shaped end portion, and a second electrode formed on a non-concave outer surface of the "W"-like shaped end portion, and an outer case securing the external electrode fluorescent lamp.

In another aspect, an external electrode fluorescent lamp includes a lamp tube having two end portions and an intermediate portion between the end portions and a diameter of the end portions being larger than a diameter of the intermediate portion, and external electrodes respectively formed on an outer surface of the end portions of the lamp tube.

In yet another aspect, a backlight unit includes an external electrode fluorescent lamp including a lamp tube having two end portions and an intermediate portion between the end portions and a diameter of the end portions being larger than a diameter of the intermediate portion, and external electrodes respectively formed on an outer surface of the end portions of the lamp tube, and an outer case securing the external electrode fluorescent lamp.

In another aspect, a liquid crystal display device includes a liquid crystal display panel including an upper substrate, a lower substrate attached to the upper substrate, and a liquid crystal layer between the upper and lower substrates, a backlight unit disposed at a back side of the liquid crystal display panel, the backlight unit including an external electrode fluorescent lamp having a lamp tube having two end portions and an intermediate portion between the end portions and a diameter of the end portions being larger than a diameter of the intermediate portion, and external electrodes respectively formed on an outer surface of the end portions of the lamp tube, and an outer case securing the external electrode fluorescent lamp.

In yet another aspect, a method for manufacturing an external electrode fluorescent lamp includes inserting a first glass tube into a second glass tube by a predetermined depth, the first glass tube having a diameter smaller than the second glass tube, forming a lamp tube by hermetically joining the first glass tube and the second glass tube, and forming an external electrode on the lamp tube.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 6A to 6D are views illustrating a manufacturing method for an EEFL according to an embodiment of the present invention;

FIGS. 8A to 8D are views illustrating a manufacturing method for an EEFL according to another embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 3:
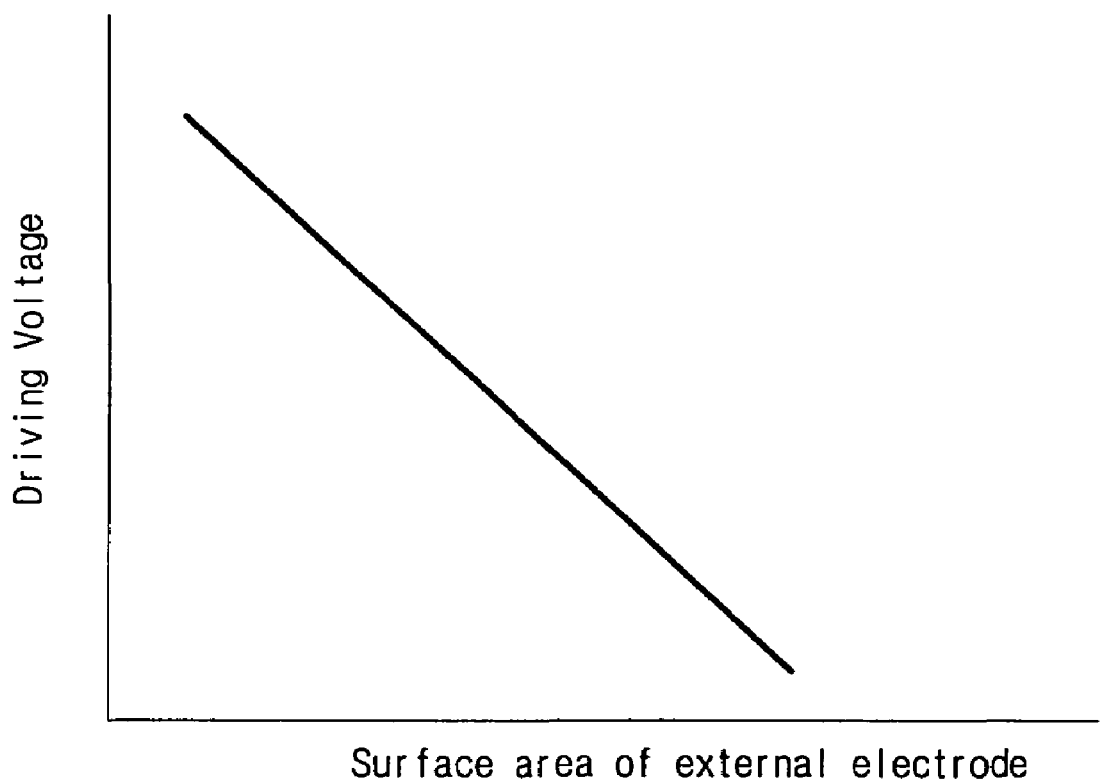
FIG. 3 is a graph illustrating a driving voltage for an EEFL.

FIG. 3 is a graph illustrating a driving voltage for an EEFL. As shown in FIG. 3, a driving voltage is inversely proportional to a surface area of an external electrode of an EEFL. Thus, on the basis of this characteristic of an EEFL, an embodiment of the present invention proposes a method capable of reducing a driving voltage by increasing the surface area of the external electrode. However, when the length of the external electrode is increased to increase the surface area thereof, the width of a bezel region, which blocks light, is undesirably increased. Therefore, an embodiment of the present invention further proposes a method capable of forming a narrow bezel region while increasing the surface area of the external electrode, thereby reducing a driving voltage.

Figure 4:
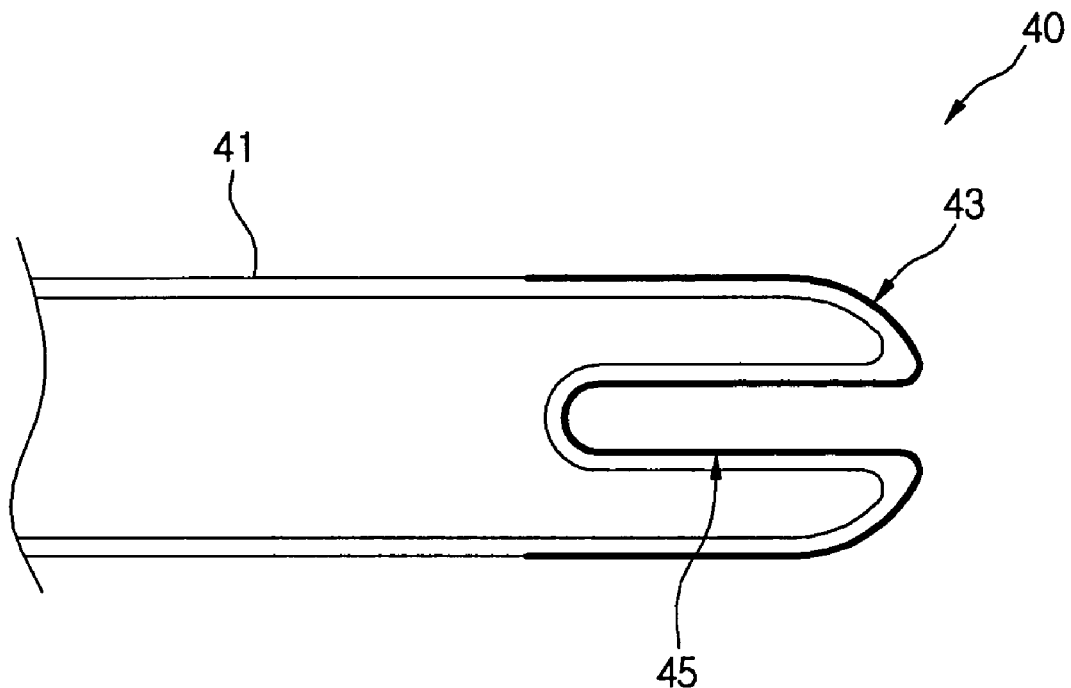
FIG. 4 is a partial cross-sectional view illustrating an EEFL according to an embodiment of the present invention.

FIG. 4 is a partial cross-sectional view illustrating an EEFL according to an embodiment of the present invention. In FIG. 4, an EEFL includes a lamp tube 41 and a double-tube external electrode. In particular, the lamp tube 41 has a "W"-like shape at its end portion, and the double-tube external electrode is formed to cover an outer surface of the "W"-like shaped end portion.

The double-tube external electrode includes a first electrode 45 formed on a concave outer surface of the "W"-like shaped end portion and a second electrode 43 formed on a non-concave outer surface of the "W"-like shaped end portion. As a result, the double-tube external electrode also has a "W"-like shape. Accordingly, the double-tube external electrode has a larger surface area than the related art external electrode shown in FIG. 2.

Figure 1:
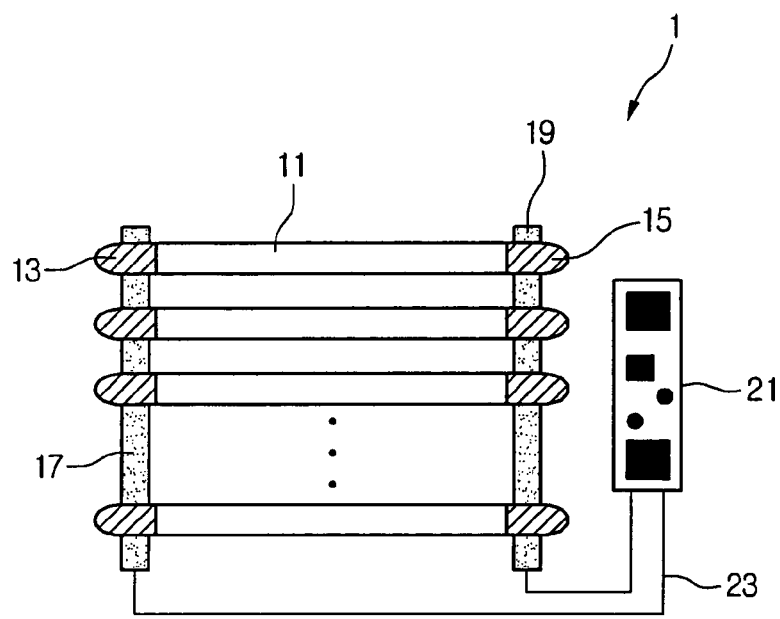
FIG. 1 is a plane view illustrating a direct type backlight unit of an LCD device according to the related art.
Figure 2:
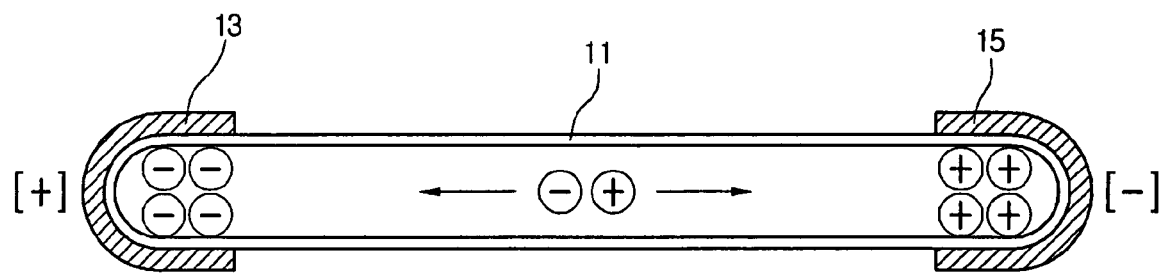
FIG. 2 is a cross-sectional view illustrating an EEFL of the backlight unit shown in FIG. 1 during an emission.

In addition, the double-tube external electrode may the same width as the related art external electrode shown in FIG. 2, thereby minimizing a bezel region. Further, the EEFL shown in FIG. 4 may be driven by the same voltage level as the related art external electrode, even if the EEFL shown in FIG. 4 is longer than the related art EEFL lamp shown in FIG. 2 because the EEFL shown in FIG. 4 has a larger surface area than the related art external electrode shown in FIG. 2.

Figure 5:
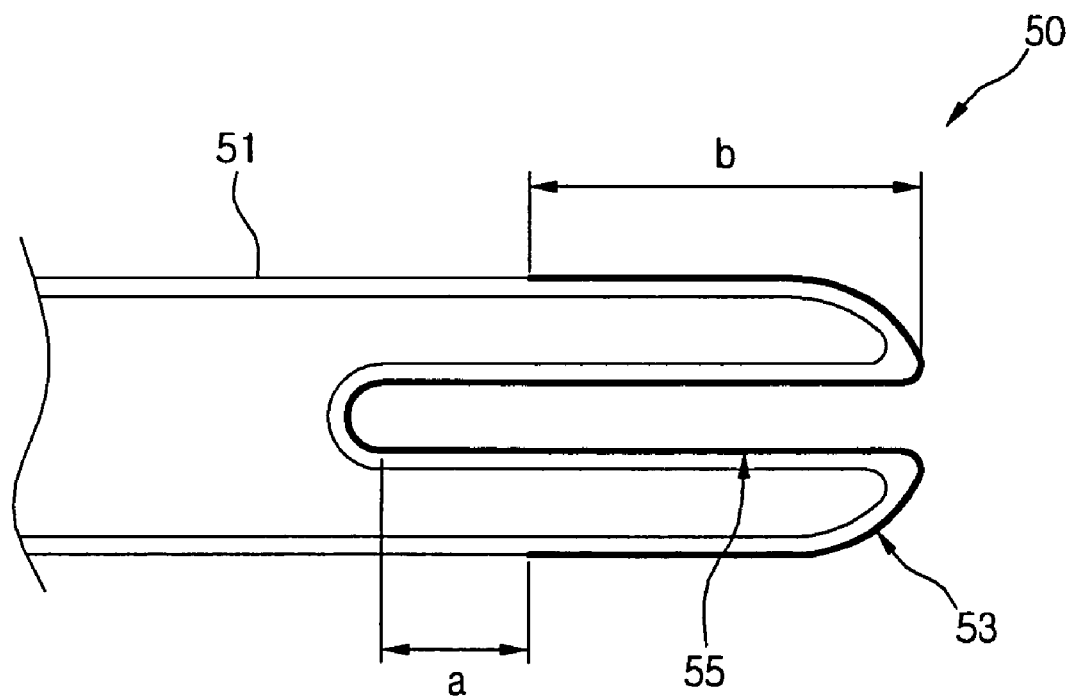
FIG. 5 is a partial cross-sectional view illustrating an EEFL according to another embodiment of the present invention.

FIG. 5 is a partial cross-sectional view illustrating an EEFL according to another embodiment of the present invention. In FIG. 5, an EEFL 50 includes a lamp tube 51 and a double-tube external electrode. The lamp tube 51 has a "W"-like shape at its end portion, and the double-tube external electrode is formed to cover an outer surface of the "W"-like shaped end portion.

The double-tube external electrode includes a first electrode 55 formed on a concave outer surface of the "W"-like shaped end portion and a second electrode 53 formed on a non-concave outer surface of the "W"-like shaped end portion. In particular, the first electrode 55 is further extended toward a middle of the EEFL 50 by a distance of "a" than the second electrode 53, thereby increasing a surface area of the double-tube external electrode.

Accordingly, the double-tube external electrode prevents an increase in a non-emission region and the width of a bezel and facilitates the manufacture of a compact module. Accordingly, an emission region of the lamp 51 is maximized while the surface area of the external electrode is increased.

Figure 6A:
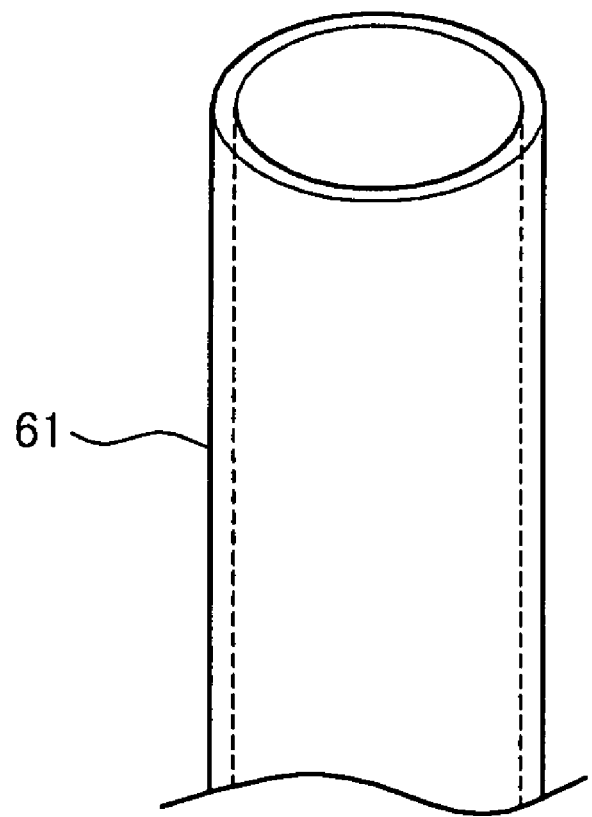
Figure 6B:
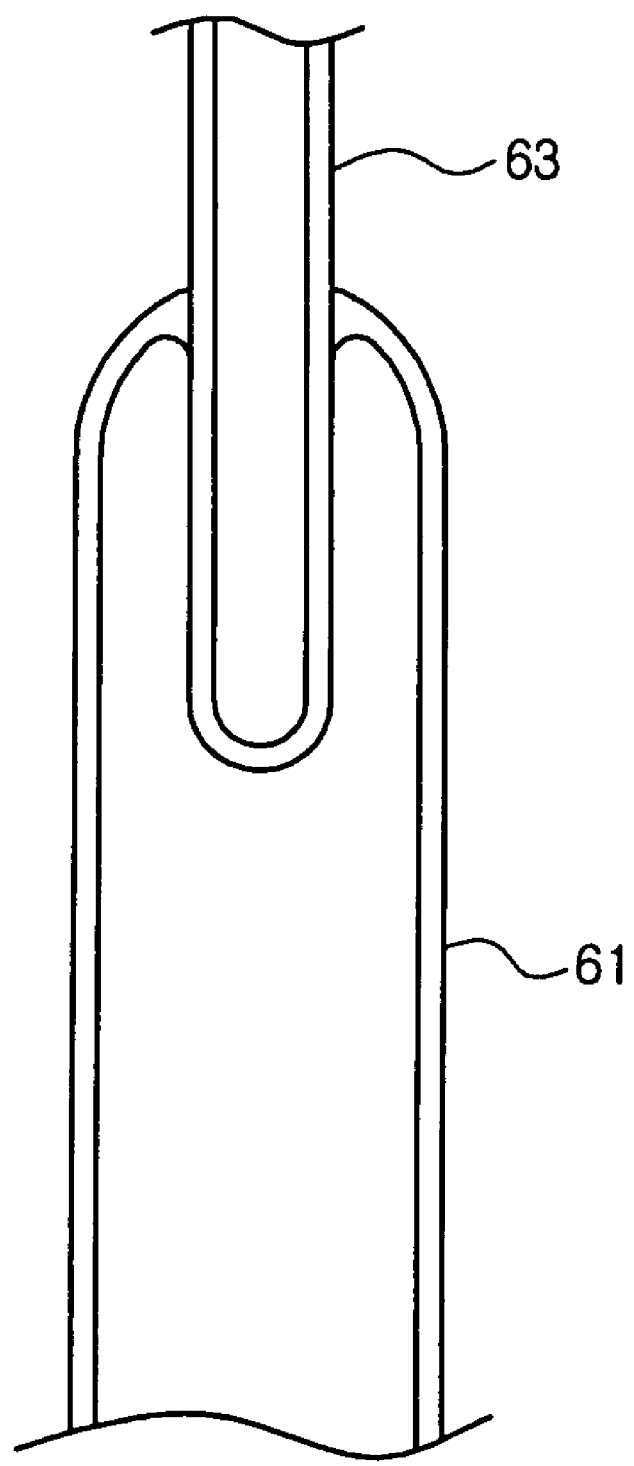

FIGS. 6A to 6D are views illustrating a manufacturing method for an EEFL according to an embodiment of the present invention. As shown in FIGS. 6A and 6B, a first glass tube 63 is inserted by a predetermined depth into a second glass tube 61 having a larger diameter than the first glass tube 63, and then an end surface of the second glass tube 61 is hermetically joined with the first glass tube 63. Then, as shown in FIG. 6C, a lamp tube 65 is formed by cutting a non-inserted portion of the first glass tube 63. Accordingly, the lamp tube 65 has a "W"-like shape at its end portion.

Figure 6D:
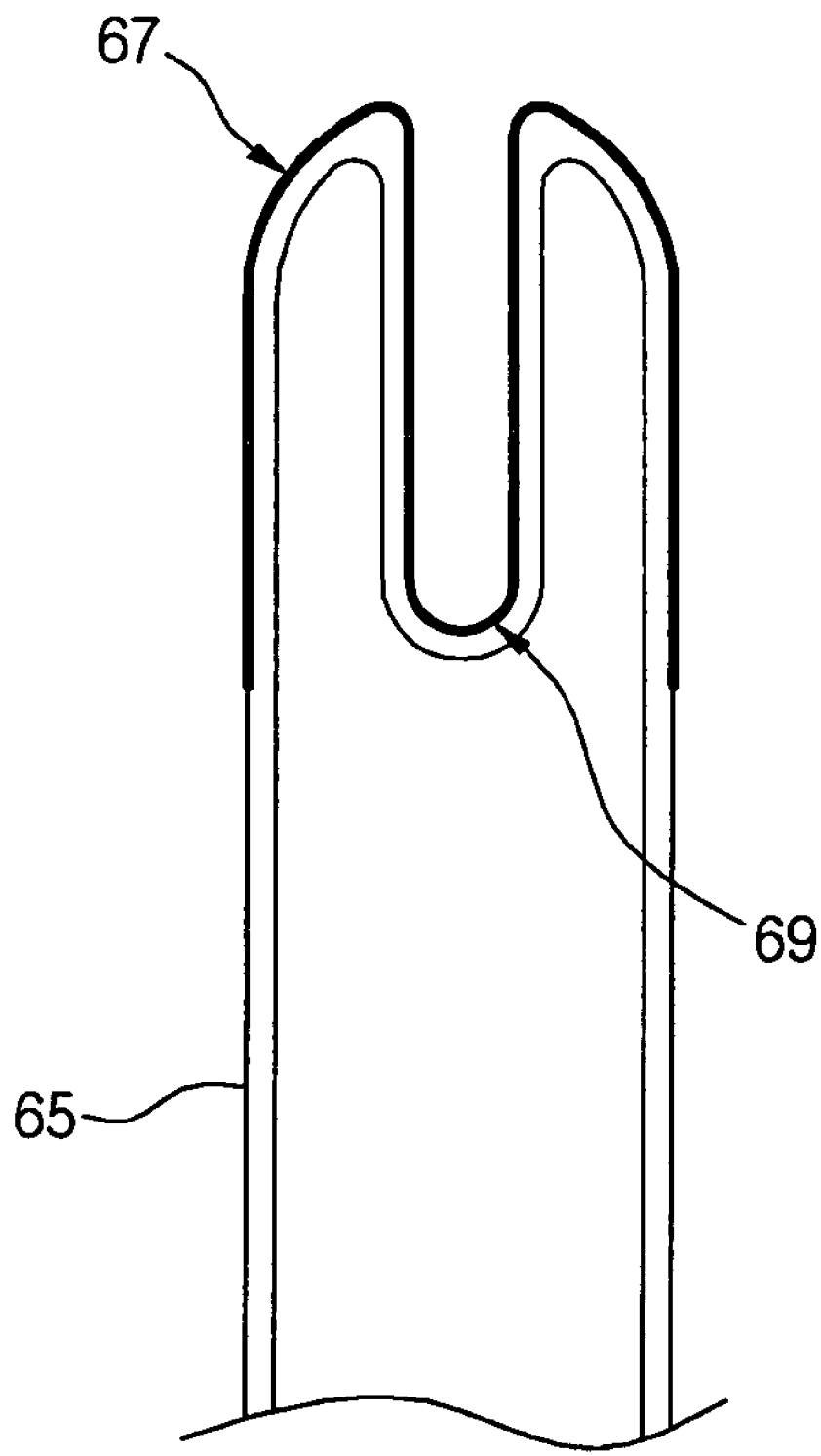

Thereafter, as shown in FIG. 6D, a first electrode 69 is formed on a concave outer surface of the "W"-like shaped end portion and a second electrode 67 is formed on a non-concave outer surface of the "W"-like shaped end portion. The first and second electrodes 67 and 69 may include an alloy, such as a Sn—Zn alloy, and may be formed using a dipping or plating process. Alternatively, the first electrode 69 may be formed on an inner surface of the first glass tube 63 prior to joining the first glass tube 63 with the second glass tube 61.

Moreover, although not shown, the lamp tube 65 may undergo additional processes, such as a phosphor/fluorescent material coating process and a rare gas injection process.

Figure 7:
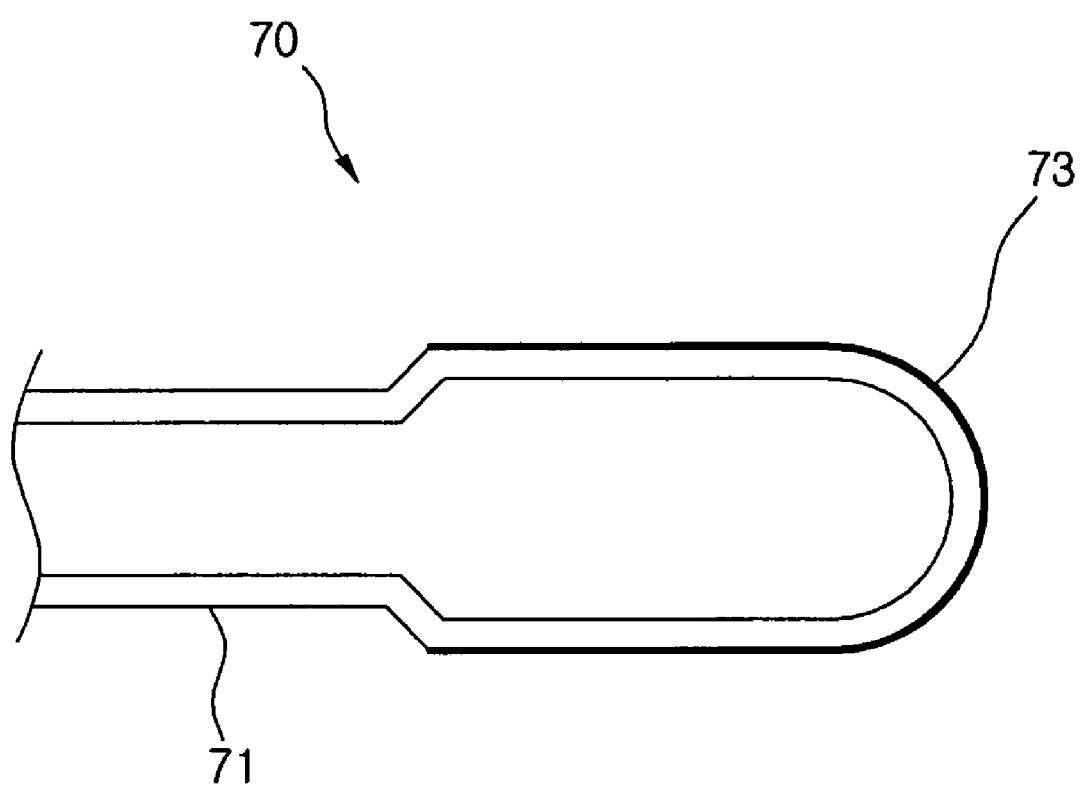
FIG. 7 is a partial cross-sectional view illustrating an EEFL according to yet another embodiment of the present invention.

FIG. 7 is a partial cross-sectional view illustrating an EEFL according to yet another embodiment of the present invention. In FIG. 7, an EEFL 70 includes a lamp tube 71. The lamp tube 71 has two end portions and an intermediate portion, which is an emission region, between the end portions. The EEFL 70 also includes an external electrode 73 formed on each of the end portions. In particular, the end portion has a diameter larger than the diameter of the intermediate portion. Accordingly, the external electrode 73 of the EEFL 70 has a larger surface area than the related art external electrode shown in FIG. 2.

For example, when used in an LCD device of 30-inch or larger, the emission region of the lamp 71 may be formed of a glass tube having an outer diameter of about 4 mm, and an end portion corresponding to the external electrode 73 may be formed of a glass tube having an outer diameter of about 6 mm. As a result, a surface area of the external electrode becomes larger by 50% than the related art external electrode shown in FIG. 2. Such an increase in the surface area of the external electrode then helps to keep the voltage in a driving voltage low.

Figure 8B:
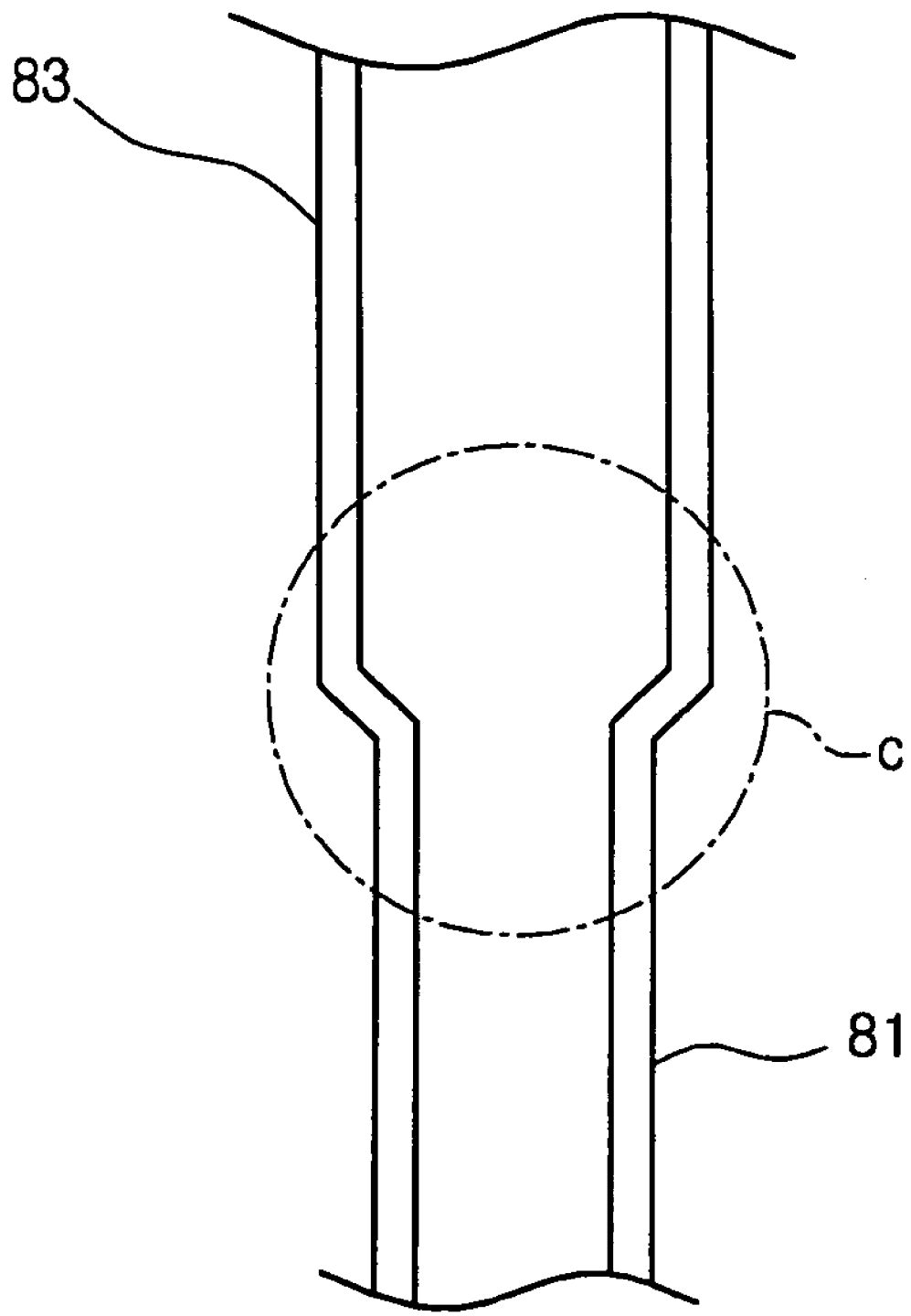
Figure 8C:
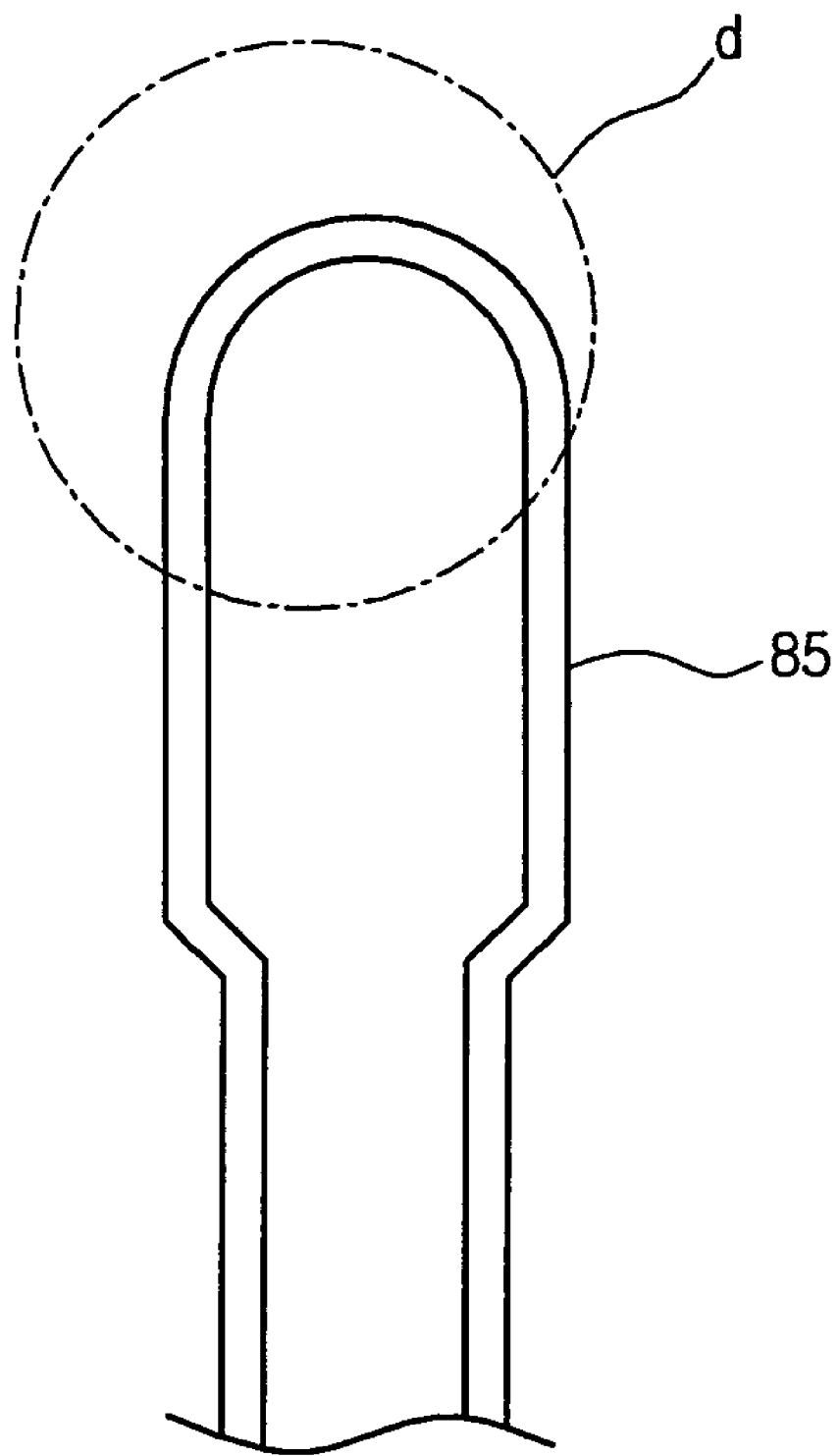

FIGS. 8A to 8D are views illustrating a manufacturing method for an EEFL according to another embodiment of the present invention. As shown in FIGS. 8A and 8B, a fourth glass tube 81 is inserted by a predetermined depth into a third glass tube 83 having a larger diameter than the fourth glass tube 81, and then an end surface of the fourth glass tube 81 is hermetically joined with the third glass tube 83. Then, as shown in FIG. 8C, a lamp tube 85 is formed by sealing another end surface of the third glass tube 83. For example, an end surface of the third glass tube 83 that does not overlap the fourth glass tube 81 may be sealed. Accordingly, the lamp tube 85 has an end portion with a diameter larger than a diameter of its intermediate portion.

Figure 8D:
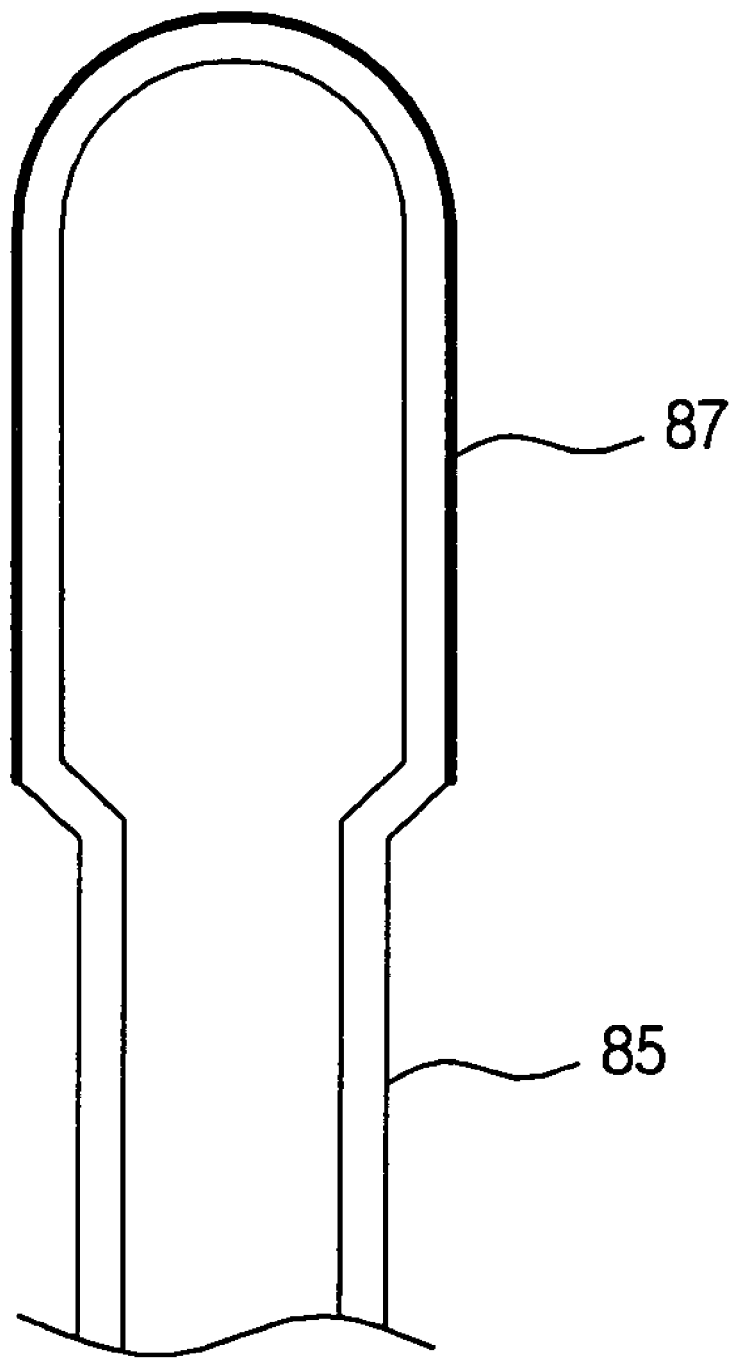

Thereafter, as shown in FIG. 8D, an external electrode 87 is formed on the end portion of the lamp tube 85. The external electrode 87 may include an alloy, such as a Sn—Zn alloy, and may be formed using a dipping or plating process. Alternatively, the external electrode 87 may be formed by attaching a conductive tape, e.g., an aluminum tape, on the end portion of the lamp tube 85.

Moreover, although not shown, the lamp tube 85 may undergo additional processes, such as a phosphor/fluorescent material coating process and a rare gas injection process.

Accordingly, an external electrode fluorescent lamp and a manufacturing method thereof according to an embodiment of the present invention increase an external surface area of an external electrode, thereby making it possible to drive the EEFL at a low driving voltage. In addition, an external electrode fluorescent lamp and a manufacturing method thereof according to an embodiment of the present invention provide a multi-driving and a high brightness. Moreover, an external electrode fluorescent lamp and a manufacturing method thereof according to an embodiment of the present invention increase an external surface area of an external electrode of the EEFL while minimizing and narrowing a bezel region by reducing the length of the external electrode, thereby maximizing a light-emitting region.

It will be apparent to those skilled in the art that various modifications and variations can be made in the external electrode fluorescent lamp and the manufacturing method thereof of the present invention without departing from the spirit or scope of the invention. Thus, it is intended that the present invention covers the modifications and variations of this invention provided they come within the scope of the appended claims and their equivalents.

What is claimed is:

1. An external electrode fluorescent lamp, comprising:
a lamp tube having a "W"-like shaped end portion; and a double-tube external electrode formed on an outer surface of the "W"-like shaped end portion, the double-tube external electrode including
a first electrode on a concave outer surface of the "W"-like shaped end portion, and
a second electrode formed on a non-concave outer surface of the "W"-like shaped end portion.

2. The external electrode fluorescent lamp according to claim 1, wherein a length of the first electrode is larger than a length of the second electrode.

3. The external electrode fluorescent lamp according to claim 1, wherein a length of the first electrode is substantially the same as a length of the second electrode.

4. The external electrode fluorescent lamp according to claim 1, wherein the first electrode and the second electrode are electrically connected to each other.

5. A backlight unit, comprising:
an external electrode fluorescent lamp including
a lamp tube having a "W"-like shaped end portion, and
a double-tube external electrode formed on an outer surface of the "W"-like shaped end portion, the double-tube external electrode including
a first electrode on a concave outer surface of the "W"-like shaped end portion, and
a second electrode formed on a non-concave outer surface of the "W"-like shaped end portion; and
an outer case securing the external electrode fluorescent lamp.

6. A liquid crystal display device, comprising:
a liquid crystal display panel including an upper substrate, a lower substrate attached to the upper substrate, and a liquid crystal layer between the upper and lower substrates;
a backlight unit disposed at a back side of the liquid crystal display panel, the backlight unit including an external electrode fluorescent lamp having
a lamp tube having a "W"-like shaped end portion, and
a double-tube external electrode formed on an outer surface of the "W"-like shaped end portion, the double-tube external electrode including
a first electrode on a concave outer surface of the "W"-like shaped end portion, and
a second electrode formed on a non-concave outer surface of the "W"-like shaped end portion; and
an outer case securing the external electrode fluorescent lamp.

7. A method for manufacturing an external electrode fluorescent lamp, comprising:
inserting a first glass tube into a second glass tube by a predetermined depth, the first glass tube having a diameter smaller than the second glass tube;
forming a lamp tube by hermetically joining the first glass tube and the second glass tube; and
forming an external electrode on the lamp tube.

8. The method according to claim 7, wherein
the forming the lamp tube includes after hermetically joining the first glass tube and the second glass tube, cutting a non-inserted portion of the first glass tube to a "W"-like shaped end portion, and
the forming the external electrode includes forming a first electrode on a concave outer surface of the "W"-like shaped end portion and a second electrode on a non-concave outer surface of the "W"-like shaped end portion.

9. The method according to claim 8, wherein the first electrode is formed on an inner surface of the first glass tube prior to joining the first glass tube and the second glass tube.

10. The method according to claim 8, wherein forming the first electrode and the second electrode includes one of a dipping process and a plating process.

11. The method according to claim 7, wherein the forming the lamp tube includes:
after hermetically joining the first glass tube and the second glass tube, sealing an end surface of the second glass tube.

12. The method according to claim 11, wherein forming the external electrode includes one of a dipping process, a plating process and a tape adhesion process.

* * * * *